United States Patent [19]

Crane

[11] Patent Number: 4,644,495

[45] Date of Patent: Feb. 17, 1987

[54] VIDEO MEMORY SYSTEM

[75] Inventor: David P. Crane, Menlo Park, Calif.

[73] Assignee: Activision, Inc., Mountain View, Calif.

[21] Appl. No.: 568,078

[22] Filed: Jan. 4, 1984

[51] Int. Cl.[4] .......................... G06F 3/14; G09G 1/02

[52] U.S. Cl. .................................... 364/900; 340/750; 340/799

[58] Field of Search ... 364/200 MS File, 900 MS File; 340/721, 723, 750, 799, 801, 802; 273/1 E, DIG. 28

[56] References Cited

U.S. PATENT DOCUMENTS

| | | | |
|---|---|---|---|
| 4,165,072 | 8/1979 | Stubben | 340/799 X |
| 4,189,728 | 2/1980 | Stubben | 340/721 X |
| 4,232,374 | 11/1980 | Chung et al. | 340/799 X |
| 4,296,476 | 10/1981 | Mayer | 364/900 |
| 4,418,344 | 11/1983 | Brown | 340/750 X |
| 4,471,464 | 9/1984 | Mayer et al. | 364/900 |

*Primary Examiner*—Raulfe B. Zache
*Assistant Examiner*—Florin Munteanu
*Attorney, Agent, or Firm*—Flehr, Hohbach, Test, Albritton & Herbert

[57] ABSTRACT

An improved video memory system includes a program memory, a display data memory, and a plurality of data fetchers. The data fetchers are used to indirectly address the display data in the display data memory. The data fetchers are programmed during vertical blanking so that selected display data is fetched at selected vertical display positions. During each scan line each data fetcher is "read" by: (1) decrementing a counter in the data fetcher; (2) comparing the counter value against preselected top and bottom values; and (3) using the counter value to indirectly address display data that is to be displayed on the current scan line if the counter value is between the top and bottom values. This relieves the host computer of having to keep track of the current vertical display position, thereby freeing it to use the saved computer cycles to produce more interesting viedo games with more complex display graphics. In addition there are provided data fetchers that can be programmed to periodically issue signals usable either for drawing a line with a predefined slope or modulating the amplitude of a sound generator.

20 Claims, 16 Drawing Figures

CARTRIDGE MEMORY SYSTEM

BASIC DATA FETCHER

MUSIC MODE DATA FETCHER

ADDRESS SELECT

| | | SIN5 | SIN6 | SIN7 | AMPLITUDE | |
|---|---|---|---|---|---|---|
| | WEIGHT | 4 | 5 | 6 | (hex) | (binary) |
| VALUES | | 0 | 0 | 0 | 0 | 0000 |
| | | 1 | 0 | 0 | 4 | 0100 |
| | | 0 | 1 | 0 | 5 | 0101 |
| | | 1 | 1 | 0 | 9 | 1001 |
| | | 0 | 0 | 1 | 6 | 0110 |
| | | 1 | 0 | 1 | A | 1010 |
| | | 0 | 1 | 1 | B | 1011 |
| | | 1 | 1 | 1 | F | 1111 |

MUSIC AMPLITUDE VALUES

OUTPUT LOGIC

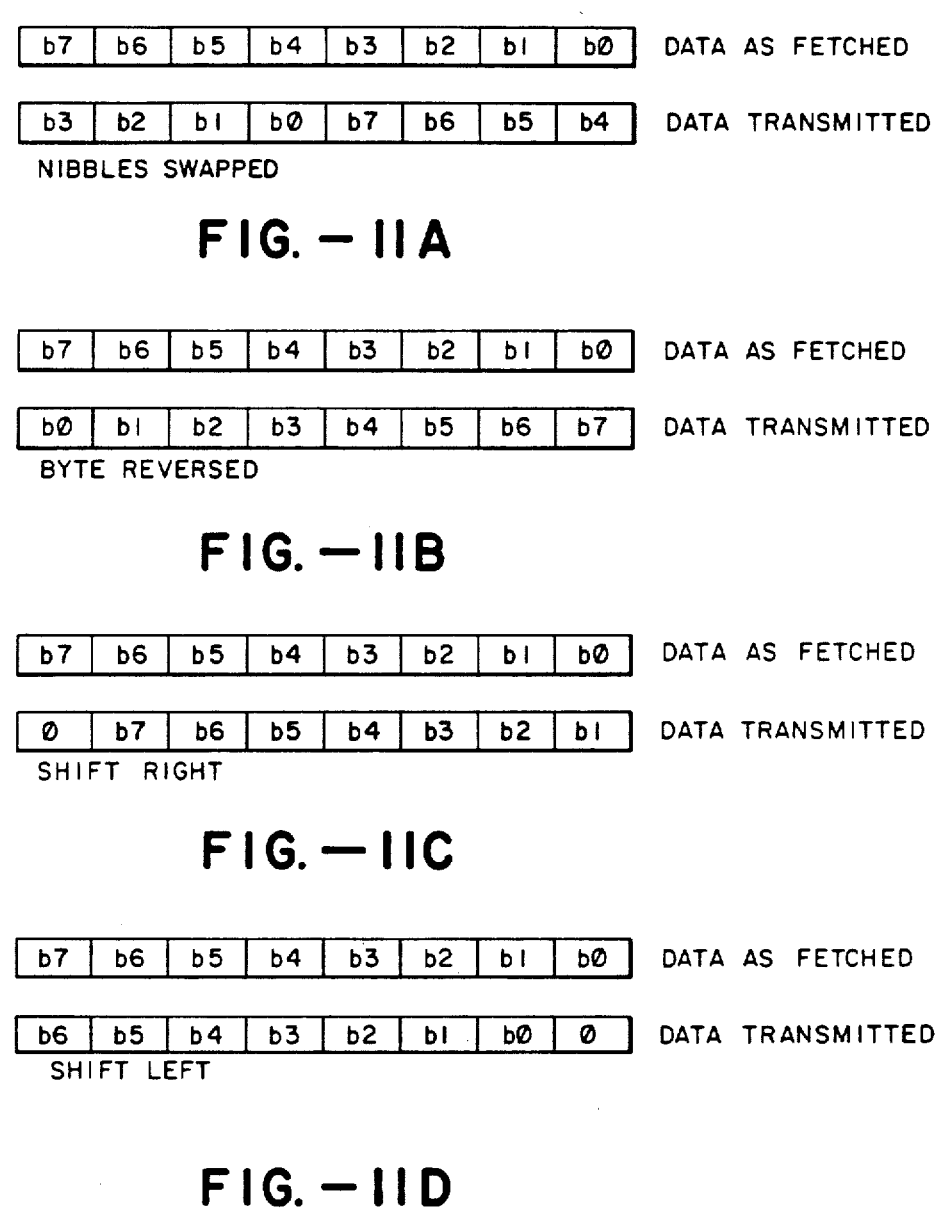

| | | | | | | | | |
|---|---|---|---|---|---|---|---|---|
| b7 | b6 | b5 | b4 | b3 | b2 | b1 | bØ | DATA AS FETCHED |
| b3 | b2 | b1 | bØ | b7 | b6 | b5 | b4 | DATA TRANSMITTED |

NIBBLES SWAPPED

FIG.—11A

| | | | | | | | | |
|---|---|---|---|---|---|---|---|---|
| b7 | b6 | b5 | b4 | b3 | b2 | b1 | bØ | DATA AS FETCHED |
| bØ | b1 | b2 | b3 | b4 | b5 | b6 | b7 | DATA TRANSMITTED |

BYTE REVERSED

FIG.—11B

| | | | | | | | | |
|---|---|---|---|---|---|---|---|---|
| b7 | b6 | b5 | b4 | b3 | b2 | b1 | bØ | DATA AS FETCHED |
| Ø | b7 | b6 | b5 | b4 | b3 | b2 | b1 | DATA TRANSMITTED |

SHIFT RIGHT

FIG.—11C

| | | | | | | | | |
|---|---|---|---|---|---|---|---|---|
| b7 | b6 | b5 | b4 | b3 | b2 | b1 | bØ | DATA AS FETCHED |
| b6 | b5 | b4 | b3 | b2 | b1 | bØ | Ø | DATA TRANSMITTED |

SHIFT LEFT

FIG.—11D

VIDEO MEMORY SYSTEM

The present invention relates generally to add-on memory systems and particularly to plug-in memory modules for use in a video display system.

BACKGROUND OF THE INVENTION

In a variety of computer systems the computer memory can be supplemented with add-on memory systems known as cartridges or plug-in memory modules. Typically these cartridges contain preprogrammed read only memories (ROMs) and are used as a convenient medium for the sale or licensing of popular software packages, including video games.

In video game applications the cartridge memory normally comprises one or more arrays of read only memory which contain both computer instructions and video display data. The computer instructions are processed by the computer and thereby control the placement and movement of display images.

The cartridges for these systems are passive devices in that the computer does all the calculations and controls the selection and timing for fetching data from the cartridge for display on a video system. In these systems the complexity of the game and its display images is limited primarily by the speed and data bandwidth of the computer.

It is therefore a primary object of this invention to provide an improved add-on memory system for increasing the capability of a computer system to execute complex video display oriented computer programs. The add-on memory system is to perform certain functions normally performed by the computer system.

An additional object of the invention is to provide a memory system in accordance with the above objectives that is housed in a plug-in cartridge and can be manufactured at low cost.

SUMMARY OF THE INVENTION

In accordance with these objectives there is provided a video memory cartridge comprising a program memory, a display data memory, and a plurality of data fetchers. The data fetchers are used to indirectly address the display data in the display data memory. The data fetchers are programmed during vertical blanking so that selected display data is fetched at selected vertical display positions. During each scan line each data fetcher is "read" by: (1) decrementing a counter in the data fetcher; (2) comparing the counter value against preselected top and bottom values; and (3) using the counter value to indirectly address display data that is to be displayed on the current scan line if the counter value is between the top and bottom values. This relieves the host computer of having to keep track of the current vertical display position, thereby freeing it to use the saved computer cycles to produce more interesting video games with more complex display graphics. In addition there are provided data fetchers that can be programmed to periodically issue signals usable either for drawing a line with a predefined slope or modulating the amplitude of a sound generator.

Additional objects and features of the invention will be more readily apparent from the following detailed description and appended claims when taken in conjunction with the drawings, in which:

BRIEF DESCRIPTION OF THE DRAWINGS

FIGS. 11*a*–11*d* depict the modified read operations of the data fetchers.

DESCRIPTION OF THE PREFERRED EMBODIMENT

Figure 1A:
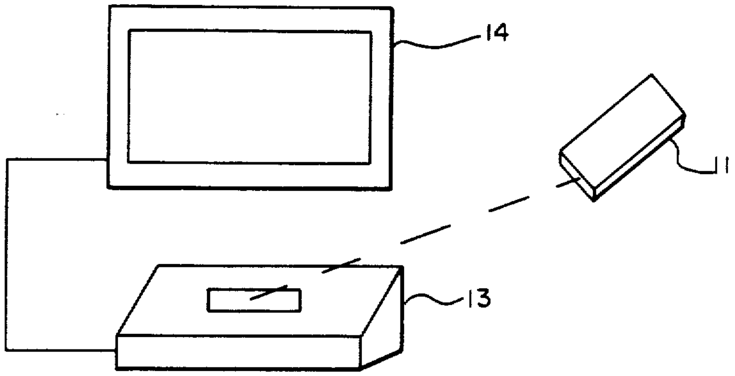
FIGS. 1*a* and 1*b* depict block diagrams of computer systems using plug-in cartridge memories embodying the present invention.

The preferred embodiment of the video memory system described below was designed to be used in conjunction with the Atari CX-2600 Video Computer System. This embodiment is a single N-channel MOS integrated circuit that contains 3968 bytes of program ROM (read only memory), 2048 bytes of graphics ROM, and control logic for the graphics ROM. The integrated circuit is housed in a cartridge and is used in place of the standard game cartridges heretofore used. The device operates as a ROM except for 128 preselected address values used to operate the control logic for the graphics ROM. The only signals connected to the cartridge are 12 address lines (providing 4096 addresses), a chip select line (or, alternately, a thirteenth address line), eight data bus lines, and two power supply lines (VCC and ground). As noted above, 128 of the 4096 available addresses are used to operate the control logic for the graphics ROM—leaving 3968 addresses for program code. These 128 addresses are used to indirectly address and fetch data from the graphics ROM. Half of these addresses are designated as write addresses and half as read addresses. Basically, the 128 addresses act as a machine level computer language for the video memory system. As described herein, in this embodiment only 93 (59 read addresses and 34 write addresses) of the 128 addresses are assigned distinct functions. Of course, in other embodiments more address lines could be used to allow the use of a larger program memory (e.g., 13 address lines would provide an 8k address space). In other embodiments the program memory could be a separate semiconductor chip from the graphics memory and fetcher portion of the video memory system.

All numerical values that are preceded by a dollar sign (i.e., "$") are encoded in standard hexademical notation (i.e., base 16, wherein A=10, B=11, C=12, D=13, E=14, and F=15). Numerical values preceded by a lower case "b" are encoded in binary notation, with the most significant bit being on the left. Logical or Boolean algebra operations are denoted as follows: (+) OR, AND, NOT, and X where the underscore is used to represent reverse logic instead of the traditional overscore.

Referring to FIG. 1*a*, many computer systems and video game systems are designed to be used in conjunction with plug-in cartridge memories 11. The cartridges typically contain computer programs and are sold to the public through a variety of retail outlets. Cartridges 11 are a convenient medium for the sale or licensing of software and for supplementing the system software of many small computers. While these cartridges can be used for many types of software, they have been most often used with video games and other computer programs which make extensive use of the video screen in such systems.

Figure 1B:
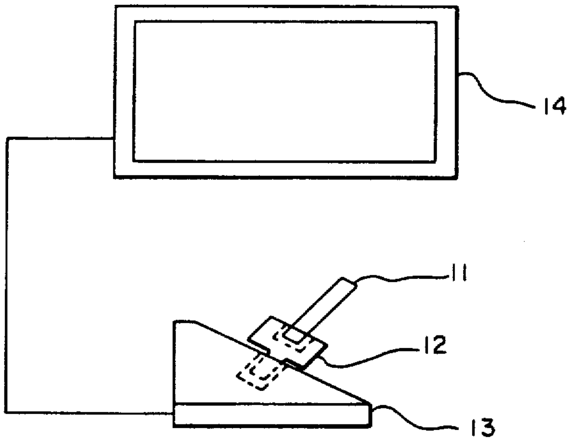

The improved video memory system described below is embodied in an improved cartridge memory device 11. It could, however, be embodied in a cartridge adapter 12 as shown in FIG. 1*b*. The cartridge adapter 12 would couple the computer system 13 by the port normally used for plug-in cartridges and would have a similar cartridge receptacle for receiving cartridges 11.

In concept, the main purpose of the data fetchers is to execute certain frequently used routines in hardware which normally are implemented in software. In this embodiment the data fetchers relieve the host computer 13 of the responsibility for "vertical checking"—the task of keeping track of the current vertical display position of the video display subsystem and of computing the current address of the display data to be displayed on the current raster scan line. Using the hardware and techniques described below, the data fetchers can be programmed to automatically fetch and transmit "vertically checked" display data. The data fetchers can also be used for drawing a line with a given slope, generating music or noise signals, and generating a random number. This reduces the computational burden on the host computer 13 which can then be programmed to use the saved computer cycles to produce more interesting video games with more complex display graphics.

Figure 2:
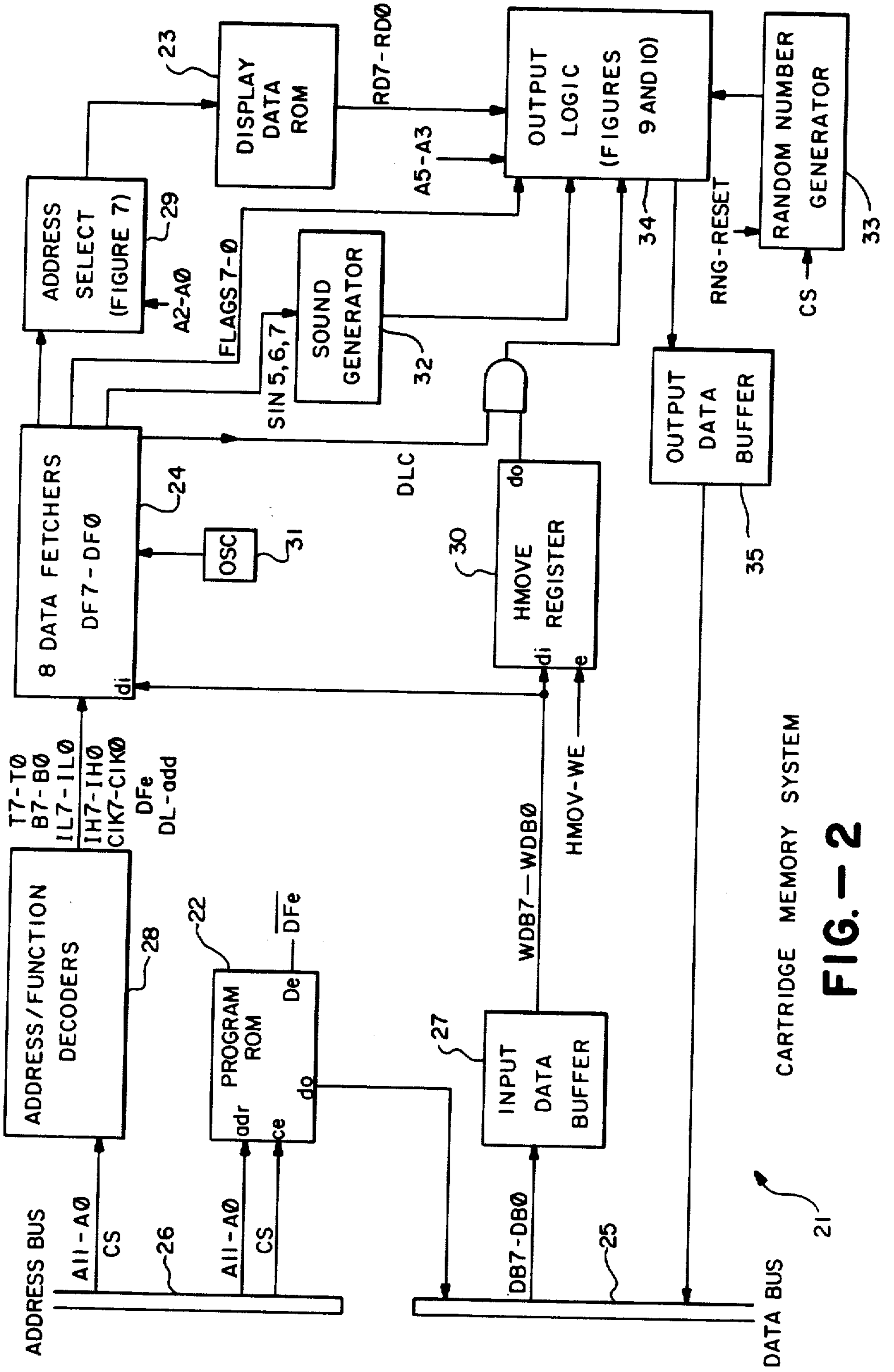
FIG. 2 is a block diagram of the major components in a plug-in cartridge memory embodying the present invention.

Referring to FIG. 2, there is shown a block diagram of a video memory system 21 in accordance with the present invention. In the preferred embodiment, the memory in the system 21 is divided into two logical blocks: program memory 22 and display data memory 23. Program memory 22 comprises 3968 bytes of read only memory (ROM), and display data memory 23 comprises 2048 (2k) bytes of ROM. Program ROM 22 is used to store normal program software while display data ROM 23 is used to store graphics or display data. Twelve address lines A11–A0 from the computer system 13 are used to address and control the system 21. A chip select signal CS (which can be viewed as a thirteenth address line) indicates that the address on the address lines is intended for use by the cartridge system 21. If the cartridge system 21 is not selected then the address signals are ignored. Furthermore, the program ROM 22 is disabled whenever the graphics data portion of the system 21 is enabled.

Eight data fetchers 24 (also denoted DF7–DF0) are used to indirectly address display data memory 23. In order to operate the data fetchers 24, the data fetchers not only retrieve data from the display data ROM 23 but can also receive data used to "program" the data fetchers 24. Buffer-amplifier 27 amplifies the relatively weak data bus signals DB7–DB0 received from computer 13, which may not have been designed to transmit data to a cartridge 11 since normally data flows from the cartridge 11 to computer 13 and not vice versa. The amplified data bus signals are denoted WDB7–WDB0.

As will be explained below, the lowest 128 address values received from the address bus 26 (i.e., from computer 13) are used to program and operate the eight data fetchers 24. Thus address values $000 through $07F are used to address the data fetchers 24, and address values $080 through $FFF are used to address the program ROM 22. The address/function decoders 28 decode these 128 address values into numerous control signals (e.g., T7–T0, B7–B0, IL7–IL0, IH7–IH0, Clk7–Clk0, DFe, DFe, DL-add, MOVAMT-WE, and RNG-reset) whose purposes will be explained below.

Each data fetcher DF7–DF0, when activated, generates an eleven-bit "indirect" address (denoted xA10–xA0, wherein "x" designates the particular data fetcher by means of an integer selected from the set 0–7) to address the display data ROM 23. Address select circuit 29 selects the address signals from the currently activated data fetcher and transmits the selected address (denoted RA10–RA0) to the display data ROM 23.

In addition to generating "indirect" address values, the data fetchers DF7–DF0 also generate "flag" signals Flag7–Flag0, indicating when the indirect address value is less than or equal to a preselected "top" value and greater than a preselected "bottom" value. As described below, these flags can be used to mask the display data and thereby provide "vertically checked" display data to the computer 13.

A special data fetcher, denoted DF4, in addition to performing normal data fetcher functions can also be slope. Data fetcher DF4 generates a "draw line carry" DLC signal used in conjunction with Draw Line Buffer 30 to perform this function.

Three special data fetchers, denoted DF5, DF6 and DF7, in addition to performing normal data fetcher functions can also be programmed to modulate the amplitude of a sound signal. Using either an internally generated asynchronous clock signal (42 kHz in the preferred embodiment) OSC generated by clock circuit 31, or a clock signal (denoted Clkx) derived from the address bus 26 signals, one or more or these "music mode" data fetchers can generate a binary signal which is weighted by sound circuit 32 and then transmitted to computer 13 to modulate the amplitude of an audio signal generated by the computer 13. In other embodiments, the clock signal OSC's frequency might range anywhere from 15 kHz to 80 kHz, depending on the application and the particular design of the sound generator 32.

Random number generator 33 generates an eight-bit random number which can be transmitted to computer 13. Random numbers can be used in video game programs to provide an element of surprise or unpredictability.

Output logic circuit 34 selects the proper output signals as a function of the input address signals A5–A3. These output signals are buffered and amplified by output data buffer 35 before being transmitted to data bus 25 and computer 13.

Figure 3:
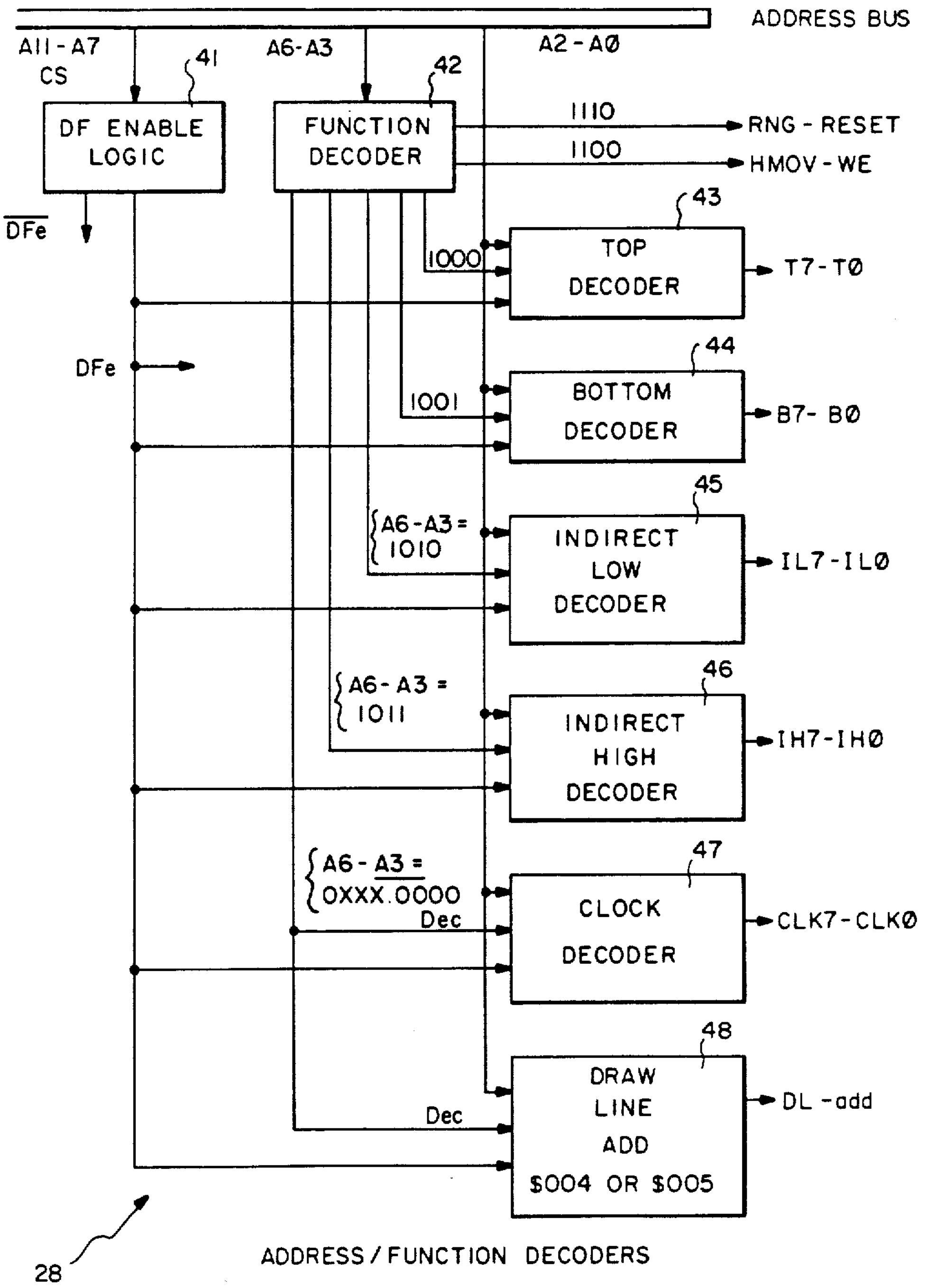
FIG. 3 is a block diagram of the address/function decoders used to control the cartridge memory system.

Referring now to FIG. 3, there is shown a preferred embodiment of the address/function decoders 28 used for controlling the operation of the data fetchers DF7–DF0 and their associated circuits. As already explained, the cartridge memory system 21 works like a normal passive ROM whenever the address value received exceeds $07F. When the received address value is between $000 and $07F, and signal CS indicates that the cartridge memory system 21 is selected, DFenable logic 41 generates a DFe signal indicating that the data fetcher circuitry is enabled; otherwise a DFe signal is generated indicating that the data fetcher circuitry is not enabled. In terms of boolean algebra, DFe=Cs AND NOT(A11+A10+A9+A8+A7). The term "data fetcher circuitry" is used herein to refer to all portions of the system 21 excluding the program ROM 22.

In the embodiment shown in FIG. 2, the CS signal enables the operation of the program ROM 22 but the output of the program ROM 22 is enabled by the DFe signal. Thus the output of the program ROM 22 is disabled if the data fetcher circuitry is enabled, thereby preventing conflicting output signals from the two portions of the system 21. In an alternate embodiment, the DFenable logic 41 also generates a PRe signal which is used to enable (i.e., as a "chip enable" type signal) the operation of the program ROM 22, and no special output enable signal for the program ROM 22 is needed. In terms of boolean algebra, PRe=CS AND (A11+A10-+A9+A8+A7).

Input address lines A6 through A3 are used by function decoder 42 to decode the function to be performed by the system 21, while address lines 42 through A0 are used to determine which of the eight data fetchers DF7–DF0 the function is to be performed by. See Table 1 below. The 128 data fetcher addresses are divided into 64 "read" 64 "write" addresses by using A6=b1 to indicate a "write" function and A6=b0 to indicate a "read" function. "Write" functions use data received from the data bus 25 to program the system 21. "Read" functions send display data or special function data to the computer 13 via the data bus 25. Thus "read" and "write" are designated from the viewpoint of computer 13. As described herein, in this embodiment only 59 read addresses 34 write addresses of the 128 available addresses are assigned distinct functions.

Each data fetcher DF7–DF0 has four programmable registers: Top, Bottom, Indirect Low, and Indirect High. The corresponding signals for writing the data on the data bus 25 into these registers (T7–T0, B7–B0, IL7–IL0, and IH7–IL0) are generated by decoders 43 through 46, using address signals A2–A0 to select one of the eight data fetchers. The two remaining "write" functions are: reset random number generator, RNG-reset, and load MOVAMT register, MOVAMT-WE.

Clock signals Clk7–Clk0 are generated by decoder 47 every time a data fetcher is "read" (i.e., for addresses between $008 and $03F). Decoder 48 generates a "draw line add" DL-add signal, whose purpose is explained below, when an input address of either $004 or $005 is received.

Figure 4:
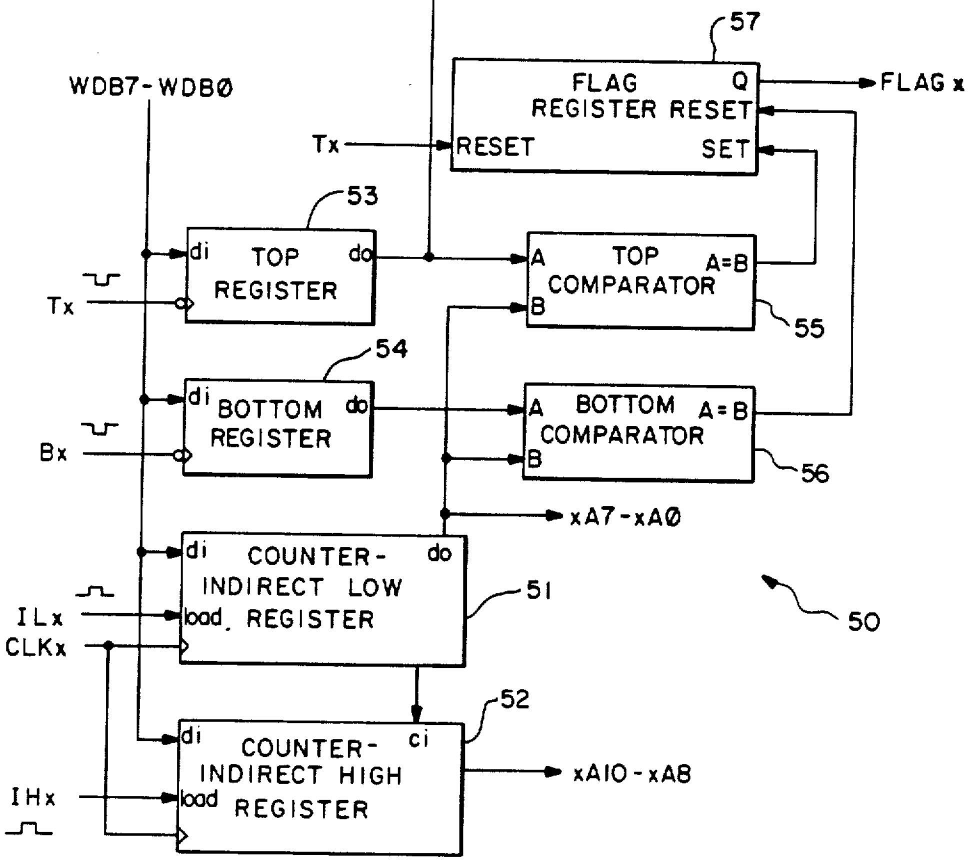
FIG. 4 depicts a block diagram of a data fetcher.

Referring to FIG. 4, there is shown a block diagram of a basic data fetcher 50. The data fetchers denoted DF3–DF0 in the preferred embodiment are basic data fetchers. Counters 51 and 52 are used to generate an eleven bit address value xA10–xA0 for addressing display data ROM 23. The counters 51 and 52 are operated as cascaded down-counters (i.e., second stage counter 52 decrements only if a carry signal is received from the first stage counter 51) that are clocked by signal Clkx every time data fetcher DFx is read. Top Register 53 and Bottom Register 54 contain eight-bit values which are compared with the eight-bit value in first stage counter 51 by Top Comparator 55 and Bottom Comparator 56, respectively. When the value in the Top Register 53 equals the value in the first stage counter 51 the Flag Register 57 is set (i.e., the Flagx signal goes on or becomes active), and when the value in the Bottom Register 54 equals the value in the first stage counter 51 the Flag Register 57 is reset (i.e., the Flagx signal goes off). The Flag Register 57 is also reset by the occurrence of a Tx signal. As will be discussed later, the logical value of the Flagx signal can used to enable or disable the transmission of data fetched from display data ROM 23 using address value xA10–xA0.

Input data WDB7–WDB0 is latched into the Top Register 53 by signal Tx, corresponding to input address signal values between $040 and $047. See Table 1. Similarly signal Bx is used to latch input data into the Bottom Register 54, signal ILx is used to latch input data into the first stage counter (also called the Indirect Low Register) 51, and signal IHx is used to latch input data into the second stage counter (also called the Indirect High Register) 52. Since the internal address value used to address the display data ROM 23 requires only eleven bits, only three data bus signals WDB2–WDB0 are latched in the the Indirect High Register 52.

Figure 5:
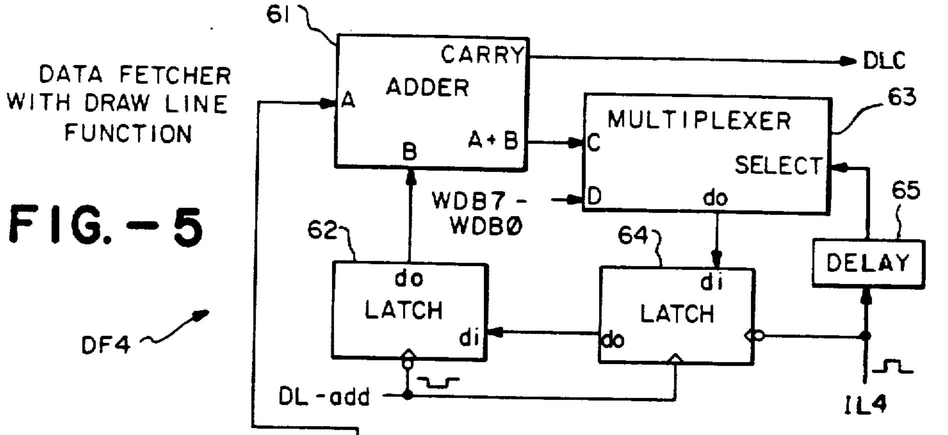
FIG. 5, in conjunction with FIG. 4, depicts a block diagram of a data fetcher with draw line capability.

Referring to FIG. 5, in conjunction with FIG. 4, there is shown a block diagram of a data fetcher (denoted DF4 in the preferred embodiment) with a special "draw line" function. The draw line circuit basically comprises an eight-bit adder 61 which adds the data value in Top Register 53 to the data value in latch 62, and a multiplexer 63 which normally transmits the result of the addition by adder 61 to a second latch 64. When the Indirect Low Register 51 is loaded with the internal data bus values WDB7–WDB0, the IL4 signal causes the multiplexer 63 to send the internal data bus values, rather than the output of the adder 51, to the second latch 64. Thus the second latch 64 is loaded with the same data as the Indirect Low Register 51. A delay circuit 65 is used to ensure that second register 64 is loaded with the data on the internal data bus lines WDB7–WDB0 by signal IL4. Upon the falling edge of each DL-add signal, at the beginning of the "read" cycle, the contents of second latch 64 are latched into first latch 62. The value in the Top Register 53 is then added to the value in this first latch 62 by adder 61 and the result is latched into second latch 64 by the rising edge of the DL-add signal at the end of the "read" cycle. Whenever the addition operation performed by adder 51 results in an overflow (i.e., the result of the addition exceeds $FF) a carry signal DLC is generated. For any given value stored in the Top Register 53, there is a corresponding ratio of DLC signals to DL-add signals (i.e., the ratio is equal to Top-value/$FF).

Figure 6:
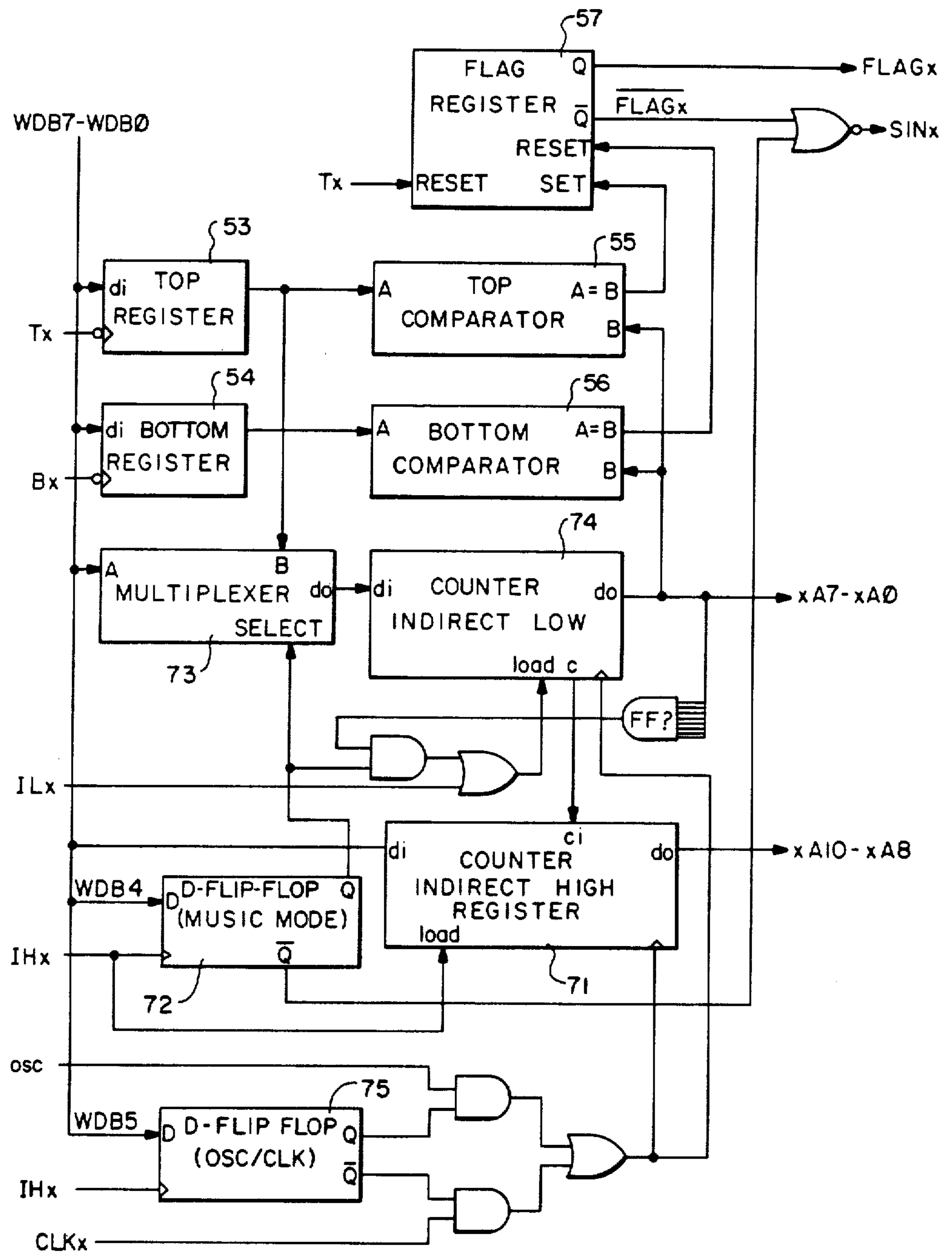
FIG. 6 depicts a block diagram of a music mode data fetcher.

Referring to FIG. 6, there is shown a "music mode data fetcher". In the preferred embodiment, data fetchers DF5, DF6 and DF7 are music mode data fetchers. These data fetchers can operate in two modes: normal data fetcher mode and music mode. The Top Register 53, Bottom Register 54, Top Comparator 55, Bottom Comparator 56 and Flag Register 57 all operate in the same manner as in the basic data fetcher shown in FIG. 4.

The mode of operation is determined by the value of WDB4 when the Indirect High Register 71 is loaded by signal IHx (where "x" 5,6 or 7). IF WDB4 equals b1 than music mode is selected, otherwise normal data fetcher mode is selected. D-Flip-Flop 72 stores the value of WDB4 when the IHx signal goes high. In music mode, multiplexer 73 transmits data from the Top Register 53, rather than from the internal data bus WDB7-WDB0, to first stage counter 74. In normal data fetcher mode data from the internal data bus lines WDB7-WDB0 is transmitted by the multiplexer 73 to the first stage counter 74. Furthermore, in music mode the first stage counter 74 is loaded with the data value in the Top Register 53 not only when the ILx signal occurs but also whenever the value in the first stage counter 74 equals $FF. Thus in music mode the value in the first stage counter decrements from the Top Register value until it reaches $FF and then restarts with the Top Register value.

The signal used to clock the two counters 71 and 74 is determined by the value of WDB5 when IHx occurs. This value of WDB5 is latched into D-Flip-Flop 75. If WDB5 equals b0 then the regular Clkx signal is used to decrement the counters 71 and 74 whenever the data fetcher is "read". However, if WDB5 equals b1 then the OSC signal (which is a 42 kHz free running clock in the preferred embodiment) is used to decrement the counters 71 and 74. The values of the Top Register 53 and Bottom Register 54 control the duty cycle and cycle period of the SINx signal, which is equivalent to the Flagx signal when the data fetcher is in music mode. (In normal data fetcher mode SINx is always off.) In most applications, using the OSC signal will produce more tonal sounds than using the Clkx signals and will require less overhead, because it eliminates the need to explicitly clock each of the music mode data fetchers. The value of the sound generator 32 can be polled either with a draw line add operation (using address $004 or $005) or without a draw line add operation (using address $006 or $007).

Each music mode data fetcher DF5, DF6 or DF7 can be considered to be a separate "voice" superimposed on the others. By polling the value of the sound generator 32 once every scan line, and at a similar rate during vertical blanking, the amplitude of the sound is modulated approximately 15,750 times per second, which is sufficient to produce a broad range of high quality sounds and sound effects.

Figures 7, 12:
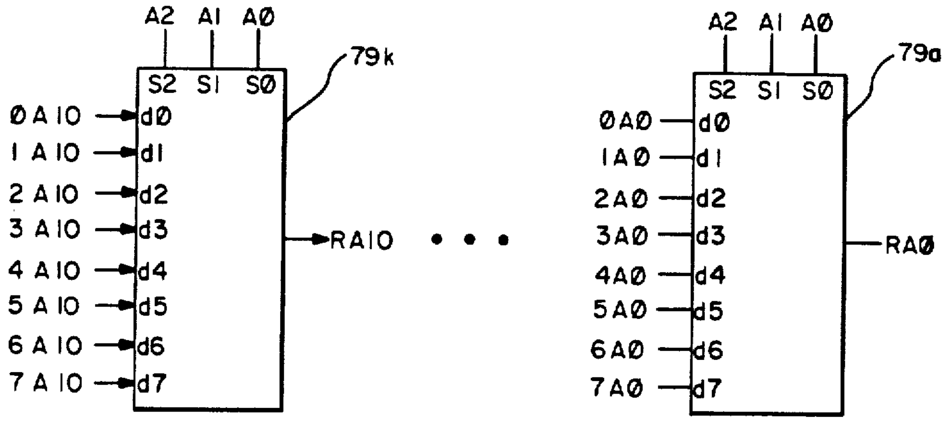
FIG. 7 depicts address select circuitry for addressing a display data ROM.
FIG. 12 is a table showing all the possible amplitude values resulting from the use of three music mode data fetchers and the sound generator circuit shown in FIG. 8.

Referring to FIG. 7, eleven 8-to-1 multiplexers 79*a*–79*k* are used to select one set of address signals for addressing the display data ROM 23. Input address signals A2, A1 and A0 are used to select the data fetcher (DFx) whose "indirect" register value (xA10–xA0) is to be used as the address RA10–RA0.

Figure 8:
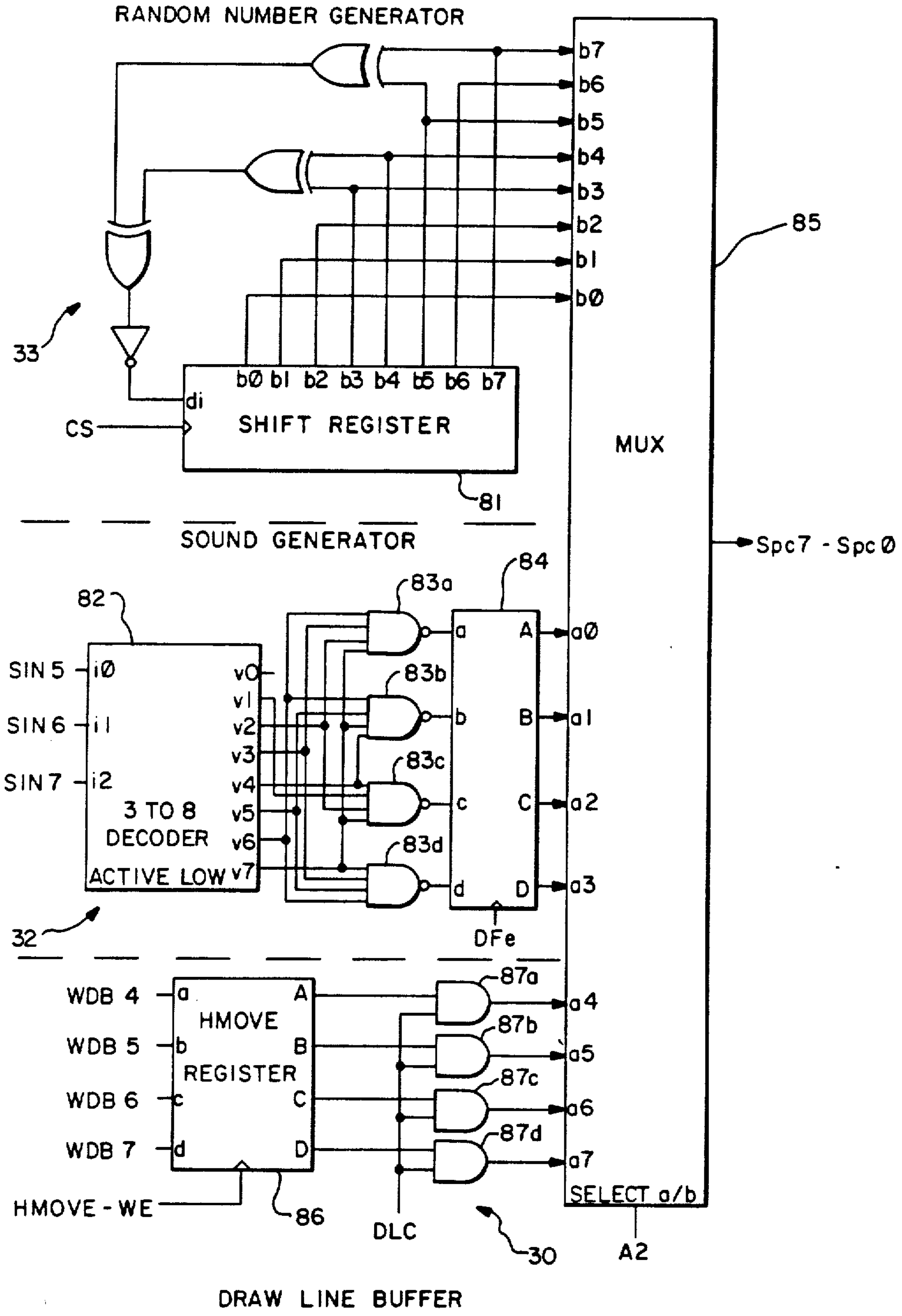
FIG. 8 depicts a random number generator, a sound generator circuit and a draw line buffer and their connection to the output logic circuitry shown in FIGS. 9 and 10.

Referring to FIG. 8, there is shown a block diagram of the Random Number Generator 33, the Sound Generator 32, and the Draw Line Buffer 30. The Random Number Generator 33 simply comprises an eight bit shift register 81 wherein the third, fourth, fifth and seventh bits are Exclusive-OR'ed, NOT'ed, and then used as the new data-in bit. In the preferred embodiment, the shift register 81 is clocked every time the cartridge system 21 is selected by the CS signal. Of course, other embodiments could use somewhat different circuitry and/or a different clock signal to achieve the same basic purpose: the generation of random data values.

The sound generator circuit 32 comprises a straightforward combinatorial logic circuit for implementing the truth table shown in FIG. 12. Basically, the one-bit SINx outputs from music mode data fetchers DF5, DF6 and DF7 are assigned weights of 4, 5 and 6, respectively and then the three signal values are "added" to one another. In the preferred embodiment this weighted addition is accomplished by the following two stage circuit. A 3-to-8 decoder 82 translates the three SINx bits into eight parallel signals v7–v0, using active-low logic, using the standard 1, 2, 4 weighting for binary digits. Seven of these signals v7–v1 are then used as inputs to four NAND gates 83*a*–83*d* to generate a four-bit weighted value in accordance with the table in FIG. 12. The weighted sound amplitude value is latched into latch 84 by signal DFe, and then transmitted to the output logic circuitry 34 by multiplexer 85. Note that for data fetchers not in music mode the SINx value is always zero. Naturally, other implementations of the sound generator adder circuit can produce equivalent results (e.g., note that input "c" to latch 84 is logically equivalent to SIN6 and that input "d" is logically equivalent to SIN7, allowing the elimination of gates 83*c* and 83*d*).

The draw line buffer 30 is simply a register 86 for storing a four-bit value called MOVAMT, and four parallel AND gates 87*a*–87*d* that allow the MOVAMT value to be transmitted to the output logic circuitry 34 only when the DLC signal is active. The MOVAMT value is read in from internal data bus lines WDB7–WDB4 by the MOVAMT-WE signal (see FIG. 3).

As shown in FIG. 8, the sound and MOVAMT signals are combined into a single eight bit signal for transmission to the output logic circuit 34. Furthermore, multiplexer 85, which is part of the output logic circuit 34, uses input address signal A2 to select either the random number generator output or the sound/draw-line output for use as signals Spc7–Spc0 by the output logic circuitry shown in FIGS. 9 and 10.

Figure 9:
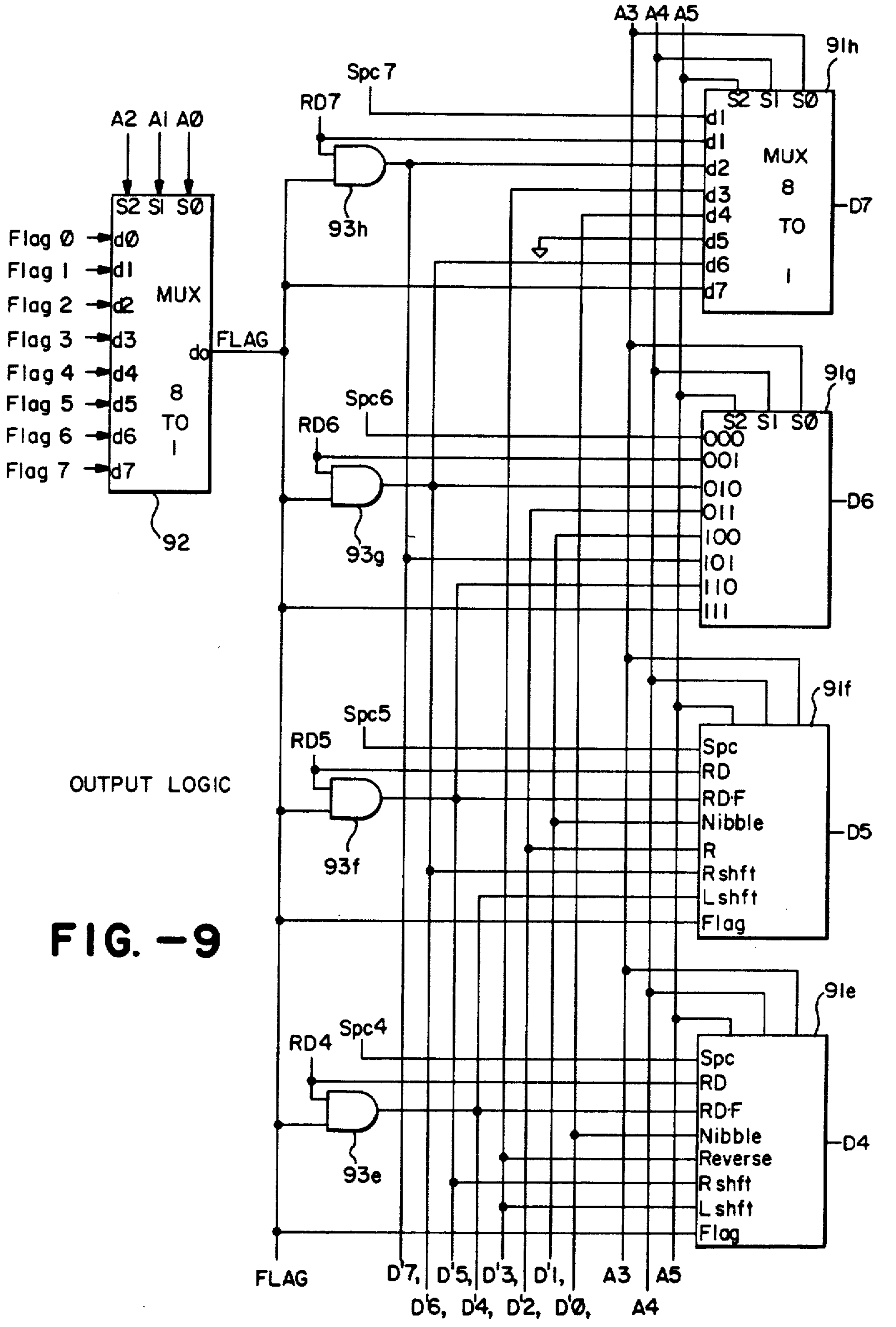
FIGS. 9 and 10, when the bottom of FIG. 9 is juxtaposed to the top of FIG. 10, depict output logic circuitry.
Figure 10:
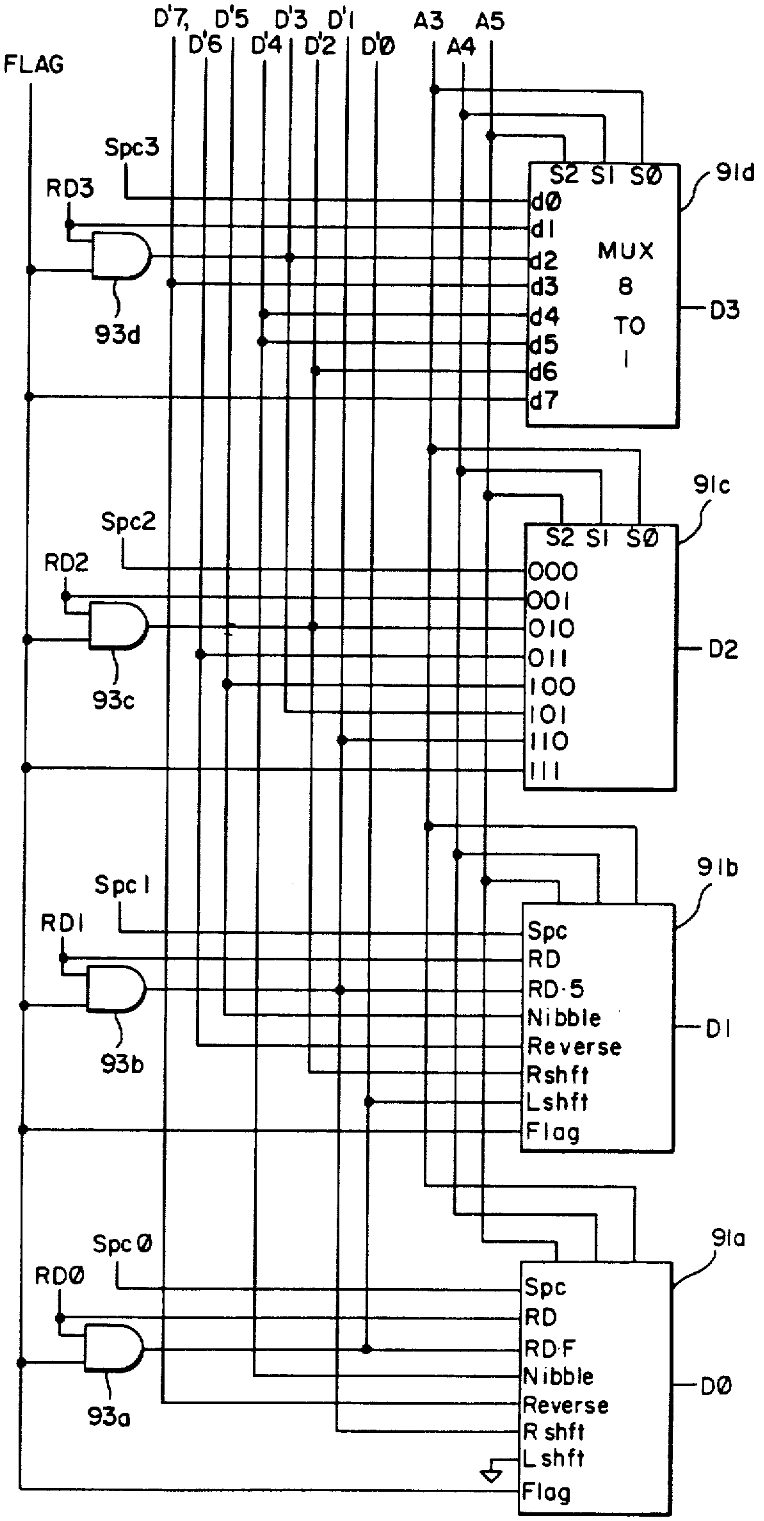

Referring to FIGS. 9 and 10, with the bottom of FIG. 9 juxtaposed to the top of FIG. 10, there is shown a circuit for implementing the read functions shown in Table 1. Eight multiplexers 91*a*–91*h* use address signals A3, A4 and A5 to determine which of eight sets of output signals to transmit to output buffer 35 (see FIG. 2). These eight sets are labeled in FIG. 9 by function in multiplexer 91*f*, by the binary value of signals A5–A3 in multiplexer 91g, and by the corresponding decimal value of the signals A5–A3 in multiplexer 91*h* for ease of following the many connections. The eight sets of available output signals are as follows: (000,d0,Spc) either an eight-bit random number or the combined sound/draw-line output; (001,d1,Rd) the indirectly addressed display data; (010,d2,RD.F) the indirectly addressed display data AND'ed with FLAG (i.e., vertically checked); (011,d3,Nibble) the indirectly addressed display data AND'ed with FLAG, with the first and last 4 bits (also known as nibbles) swapped; (100,d4,Reverse) the indirectly addressed display data AND'ed with FLAG, with the bits in reverse order; (101,d5,Rshft) the indirectly addressed display data AND'ed with FLAG, with the bits shifted rightwards (i.e., towards the low order bit) one bit position; (110,d6,Lshft) the indirectly addressed display data AND'ed with FLAG, with the bits shifted leftwards (i.e., towards the high order bit) one bit position; and (111,d7,Flag) all bits equal to the value of FLAG. See FIGS. 11a–11d for a diagrammatic view of the Nibble, Reverse, Rshft and Lshft functions.

The FLAG signal is selected from the eight Flagx signals generated by the eight data fetchers DF7–DF0 using an 8-to-1 multiplexer 92, using address signals A2–A0 to select the proper data fetcher flag. This circuit configuration is identical to the one used in the address select circuit shown in FIG. 7.

The FLAG signal is AND'ed with the indirectly addressed display data using AND gates 93h–93a to AND the FLAG with each bit of the display data. The FLAG signal is thereby used as a mask, whereby the masking operation provides vertically checked display data.

The method of operation of the above described cartridge memory system 21 is as follows. First, it should be understood that this embodiment of the memory system is designed for use with a computer having a raster scan video display having 255 or less distinct scan lines. Furthermore the computer's video display controller is of the "image-register" type rather than the video bit-map type. That is, objects or images are displayed by writing the display data into a image display register during horizontal blanking, along with a horizontal position indicator, just before the object is to be displayed. The computer 13 must keep track of the current vertical position of the video raster scan and write the display data into an image display register just when the raster scan reaches the current vertical position of that image. In other words the computer 13 must use the computer cycles available during horizontal blanking to determine for each image if that image needs to be displayed at the current vertical position. Since there are a limited number of computer cycles available during horizontal blanking, there is a corresponding limit on the number of actively moving objects that can be generated using this scheme.

Clearly, keeping track of the current vertical position, comparing it against the vertical position for each display image, and then fetching the image data if the display image belongs to the current scan line, takes more computer cycles than it would to merely fetch "vertically checked" image data. By producing vertically checked image data the present invention reduces the number of computer cycles required for each active display image and thus frees use the computer's resources for creating more interesting images, sounds, and games.

The method of the invention (i.e., of the basic data fetchers) is to initialize a down-counter with a value and to decrement the value before the display of each scan line. The initial counter 51, 52 value and the Top Register 53 value are chosen so that when the vertical position of the video display matches the uppermost vertical position of the display image, the value of the counter 51, 52 matches the value in the Top Register 53. (A "match" occurs when the bottom X bits of the counter 51, 52 exactly match the X bits in the Top Register 53. The number of bits, X, is chosen such that $2^X$ is less than or equal to the number of scan lines on the video display device. In the preferred embodiment, X equals eight.) Every time a data fetcher is "read", its internal counter 51, 52 is decremented (see signals Dec and Clkx in FIGS. 3 and 4). When a match is detected by the Top Comparator 55 the Flag 57 in the data fetcher is set, enabling the transmission of the display data addressed by the counter 51, 52. When the value in counter 51 "matches" the value in the Bottom Register 54, the Bottom Comparator 56 resets the Flag 57, thereby disabling the transmission of the display data addressed by the counter 51, 52. Thus by properly initializing one data fetcher for each display image and "reading" those data fetchers (using one of the read commands that AND's the indirectly addressed data with the Flag) before the beginning of each scan line, the computer 13 receives "vertically checked" display data. When the video scan position is above or below the current vertical position of the display image, data representing a blank image (e.g., all zero's) is transmitted by the cartridge memory system 21. When the video scan position corresponds to the current vertical position of the display image, data representing that image is transmitted. Furthermore, if the display image extends over several scan lines, the proper display data is sent for each line. For instance, if the display data for an object is stored in locations $323 to $30F in the display data ROM 23 and is to be displayed on scan lines $E0 to $F4, then the data fetcher should be initialized so that the counter 51, 52 equals $413, the Top Register 53 equals $23 and the Bottom Register 54 equals $10.

The draw line function is generally used by initializing the draw line data fetcher DF4 during vertical blanking and then "reading" the data fetcher DF4 (using address $004 or $005, thereby causing a draw line add operation) before each scan line that the line or object is to be drawn. The value received will be either zero or the four-bit value in the MOVAMT register 86. This received value is added to the current horizontal position of the line or object before the line or object is displayed on the current scan line.

As already described above, the music function is generally used by polling the value of the sound generator once every scan line, and at a similar rate during vertical blanking, and using the received value to modulate the input to an audio amplifier. The value of the Top and Bottom registers in each music mode data fetcher controls the frequency and duty cycle of the voice generated by that data fetcher.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

TABLE 1

Data Fetcher Commands

| Address | Description |
|---|---|
| $ØØØ–$Ø3F | "Read" Commands |
| $ØØØ–$ØØ3 | Random number generator |
| $ØØ4–$ØØ5 | Sound value, MOVAMT value AND'd with Draw Line Carry; with Draw Line Add |
| $ØØ6–$ØØ7 | Sound value, MOVAMT value AND'd with Draw Line Carry; without Draw Line Add |
| $ØØ8 | DFØ display data |
| $ØØ9 | DF1 display data |
| $ØØA | DF2 display data |
| $ØØB | DF3 display data |
| $ØØC | DF4 display data |
| $ØØD | DF5 display data |
| $ØØE | DF6 display data |
| $/ØF | DF7 display data |
| $Ø1Ø | DFØ display data AND'd w/flag |
| $Ø11 | DF1 display data AND'd w/flag |
| $Ø12 | DF2 display data AND'd w/flag |
| $Ø13 | DF3 display data AND'd w/flag |
| $Ø14 | DF4 display data AND'd w/flag |
| $Ø15 | DF5 display data AND'd w/flag |
| $Ø16 | DF6 display data AND'd w/flag |

TABLE 1-continued

Data Fetcher Commands

| Address | Description |
|---|---|
| $017 | DF7 display data AND'd w/flag |
| $018 | DF0 display data AND'd w/flag, nibbles swapped |
| $019 | DF1 display data AND'd w/flag, nibbles swapped |
| $01A | DF2 display data AND'd w/flag, nibbles swapped |
| $01B | DF3 display data AND'd w/flag, nibbles swapped |
| $01C | DF4 display data AND'd w/flag, nibbles swapped |
| $01D | DF5 display data AND'd w/flag, nibbles swapped |
| $01E | DF6 display data AND'd w/flag, nibbles swapped |
| $01F | DF7 display data AND'd w/flag, nibbles swapped |
| $020 | DF0 display data AND'd w/flag, byte reversed |
| $021 | DF1 display data AND'd w/flag, byte reversed |
| $022 | DF2 display data AND'd w/flag, byte reversed |
| $023 | DF3 display data AND'd w/flag, byte reversed |
| $024 | DF4 display data AND'd w/flag, byte reversed |
| $025 | DF5 display data AND'd w/flag, byte reversed |
| $026 | DF6 display data AND'd w/flag, byte reversed |
| $027 | DF7 display data AND'd w/flag, byte reversed |
| $028 | DF0 display data AND'd w/flag, rotated right |
| $029 | DF1 display data AND'd w/flag, rotated right |
| $02A | DF2 display data AND'd w/flag, rotated right |
| $02B | DF3 display data AND'd w/flag, rotated right |
| $02C | DF4 display data AND'd w/flag, rotated right |
| $02D | DF5 display data AND'd w/flag, rotated right |
| $02E | DF6 display data AND'd w/flag, rotated right |
| $02F | DF7 display data AND'd w/flag, rotated right |
| $030 | DF0 display data AND'd w/flag, rotated left |
| $031 | DF1 display data AND'd w/flag, rotated left |
| $032 | DF2 display data AND'd w/flag, rotated left |
| $033 | DF3 display data AND'd w/flag, rotated left |
| $034 | DF4 display data AND'd w/flag, rotated left |
| $035 | DF5 display data AND'd w/flag, rotated left |
| $036 | DF6 display data AND'd w/flag, rotated left |
| $037 | DF7 display data AND'd w/flag, rotated left |
| $038 | DF0 flag |
| $039 | DF1 flag |
| $03A | DF2 flag |
| $03B | DF3 flag |
| $03C | DF4 flag |
| $03D | DF5 flag |
| $03E | DF6 flag |
| $03F | DF7 flag |
| $040-$07F | "Write" Commands |
| $040 | DF0 top count |
| $041 | DF1 top count |
| $042 | DF2 top count |
| $043 | DF3 top count |
| $044 | DF4 top count |
| $045 | DF5 top count |
| $046 | DF6 top count |
| $047 | DF7 top count |
| $048 | DF0 bottom count |
| $049 | DF1 bottom count |
| $04A | DF2 bottom count |
| $04B | DF3 bottom count |
| $04C | DF4 bottom count |
| $04D | DF5 bottom count |
| $04E | DF6 bottom count |
| $04F | DF7 bottom count |
| $050 | DF0 counter low |
| $051 | DF1 counter low |
| $052 | DF2 counter low |
| $053 | DF3 counter low |
| $054 | DF4 counter low |
| $055 | DF5 counter low |
| $056 | DF6 counter low |
| $057 | DF7 counter low |
| $058 | DF0 counter high |
| $059 | DF1 counter high |
| $05A | DF2 counter high |
| $05B | DF3 counter high |
| $05C | DF4 counter high AND draw line enable |
| $05D | DF5 counter high AND music enable |
| $05E | DF6 counter high AND music enable |
| $05F | DF7 counter high AND music enable |
| $060-$067 | Draw Line Movement Value (MOVAMT) |
| $068-$06F | Not Used |
| $070-$077 | Random Number Generator Reset |
| $078-$07F | Not Used |

What is claimed is:

1. In a computer system having a raster scan video display, a central processing unit (CPU), and data and address busses coupled to said CPU for transmitting and receiving data to and from specified address locations in said computer system, said address bus including a multiplicity of binary address lines, memory apparatus comprising:

(1) first memory means, coupled to said address and data busses, for storing program instructions for controlling the operation of said computer system;

(2) second memory means having a data output port, and a multiplicity of addressable memory locations for storing video display data for display on said video display; and (3) video data acquisition means, coupling said second memory means to said address and data busses, for responding to each of a multiplicity of predefined address signal values asserted on said address bus by said CPU by transmitting corresponding selected portions of the video data in said second memory means to said data bus, including (a) decoder means coupled to said address bus for generating a multiplicity of distinct control signals when said CPU asserts corresponding address signal values on said address bus;

(b) a multiplicity of data fetcher means, each for generating a sequence of address signal values usable for addressing said second memory means, each including (1) video data selection means coupled to said data bus, responsive to predefined ones of said control signals, for selecting a sequence of video address signal values in accordance with data signal values asserted on said data bus by said CPU at the time said control signals are generated; and (2) video address generating means for generating the next address signal from said sequence of video address signal values each time said decoder means generates a predefined one of said control signals;

(c) video memory address multiplexer means, responsive to the address signal value on a first predefined subset of said binary address lines, for addressing said second memory means using the address signal value generated by the data fetcher means corresponding to the address signal value on said first predefined subset of said binary address lines; and (d) output logic, coupling said data output port of said second memory means to said data bus, responsive to the address signal on a second predefined subset of said binary address lines, for transmitting the data on said data output port of said second memory means to said data bus in one of multiplicity of predefined formats selected in accordance with the address signal value on said second predefined subset of said binary address lines.

2. Memory apparatus as set forth in claim 1, wherein each of a multiplicity of said data fetcher means includes flag means for generating a flag signal indicating whether the address signal value generated by said data fetcher means is between two specified address signal values;

and said output logic means includes, mask means for enabling and disabling the transmission of data from said second memory means to said data bus by logically combining one of said flag signals, selected in accordance with the address signal value on said first predefined subset of said binary address lines, with the data from said second memory means.

3. Memory apparatus as set forth in claim 2, wherein said first memory means includes instructions for said CPU which cause said CPU to specify said two specified address signal values for said flag means in a plurality of said data fetcher means, and to transmit, as each scan line of said raster scan video display is generated, each of a plurality of predefined address signal values on said address bus, each said predefined address signal value being selected to cause said decoder means to generate a control signal which causes a corresponding one of said plurality of data fetcher means to generate a new address signal value;

so that the video data in said second memory means addressed by each of said plurality of data fetcher means is automatically transmitted to said data bus only for a corresponding specified range of scan lines on said raster scan video display.

4. In a computer system having a raster scan video display, a central processing unit (CPU), and data and address busses coupled to said CPU for transmitting and receiving data to and from specified address locations in said computer system, said address bus including a multiplicity of binary address lines, memory apparatus comprising:

(1) first memory means, coupled to said address and data busses, for storing program instructions for controlling the operation of said computer system;

(2) second memory means having a data output port, and a multiplicity of addressable memory locations for storing video display data for display on said video display; and (3) video data acquisition means, coupling said second memory means to said address and data busses, for responding to each of a multiplicity of predefined address signal values asserted on said address bus by said CPU by transmitting corresponding selected portions of the video data in said second memory means to said data bus, including (a) decoder means coupled to said address bus for generating a multiplicity of distinct control signals when said CPU asserts corresponding address signal values on said address bus;

(b) a multiplicity of data fetcher means, each for generating a sequence of address signal values usable for addressing said second memory means; a multiplicity of said data fetcher means each including flag means for generating a flag signal indicating whether the address signal value generated by said data fetcher means is between two specified address signal values;

(c) video memory address multiplexer means, responsive to the address signal value on a first predefined subset of said binary address lines, for addressing said second memory means using the address signal value generated by the data fetcher means corresponding to the address signal value on said first predefined subset of said binary address lines; and (d) output logic means for coupling said data output port of said second memory means to said data bus, including mask means for enabling and disabling the transmission of data from said second memory means to said data bus by logically combining one of said flag signals, selected in accordance the address signal value on said first predefined subset of said binary address lines, with the data from said second memory means.

5. Memory apparatus as set forth in claim 4, wherein said output logic includes means for responding to the address signal on a second predefined subset of said binary address lines by transmitting the video data on said data output port of said second memory means to said data bus in one of multiplicity of predefined data formats selected in accordance with the address signal value on said second predefined subset of said binary address lines.

6. Memory apparatus as set forth in claim 5, wherein said predefined data formats includes leaving the data bits of the video data from said second memory means unchanged, reversing the order of said data bits, and shifting said data bits a predefined number of bits in a predefined direction.

7. Memory apparatus as set forth in claim 4, wherein each said data fetcher means includes a counter having a counter value which is incremented or decremented in response to a predefined one of said control signals;

top and bottom register means for storing top and bottom register values, respectively;

load means responsive to predefined one of said control signals for loading said counter with an initial counter value specified by data on said data bus, and for loading said top and bottom register with values, specified by data on said data bus, corresponding to the memory address boundaries of selected display data in said second memory means;

comparator means coupled to said counter means and said top and bottom register means for comparing said counter value with said top and bottom register values, including means for generating distinct top and bottom signals when said counter value matches said top and bottom register values, respectively; and said flag means, said flag means including means, responsive to said top and bottom signals, for generating a flag value which is logically true only when said counter value is between the values stored in said top and bottom register means.

8. Memory apparatus as set forth in claim 7, wherein said output logic includes means for responding to the address signal on a second predefined subset of said binary address lines by transmitting the video data on said data output port of said second memory means to said data bus in one of multiplicity of predefined data formats selected in accordance with the address signal value on said second predefined subset of said binary address lines.

9. Memory apparatus as set forth in claim 8, wherein said predefined data formats include leaving the data bits of the video data from said second memory means unchanged, reversing the order of said data bits, and shifting said data bits a predefined number of bits in a predefined direction.

10. Memory apparatus as set forth in claim 7, wherein said output logic includes means for transmitting the data on said data output port of said second memory means to said data bus rearranged in a predefined manner, corresponding to the address signal value on a second predefined subset of said binary address lines, only if said flag means indicates said counter value is between said top and bottom register values.

11. Memory apparatus as set forth in claim 7, wherein a plurality of said data fetcher means are sound amplitude data fetchers having two distinct modes of operation: data fetcher mode and sound amplitude mode, each said sound amplitude data fetcher including:

mode means for determining whether said data fetcher is in data fetcher mode or sound amplitude mode; and means operative in sound amplitude mode for loading said counter means with said top register value when said counter value decrements to a preselected value; and said memory apparatus further includes music amplitude means for generating an amplitude value and transmitting said amplitude value to said data bus in response to a predefined one of said control signals, said amplitude value being the weighted sum of said flag signals for said sound amplitude data fetchers.

12. Memory apparatus as set forth in claim 11, further including clock means running at a predetermined frequency;

wherein at least one of said sound amplitude data fetchers further includes:

means responsive to a predefined one of said control signals for coupling said clock means to said counter in said data fetcher so that said counter increments or decrements at said predetermined frequency.

13. Memory apparatus as set forth in claim 7, wherein at least one of said data fetcher means is a drawline data fetcher including:

base register means for storing a base register value;

adder means for adding said top register value to said base register value and storing the result in said base register means in response to a predefined one of said control signals, including means for producing a carry signal when said adding operation overflows a predefined portion of said base register means; and movement value means for transmitting a predefined horizontal movement value to said data bus when said adder means produces said carry signal.

14. Memory apparatus as set forth in claim 4, further including random number generator means for transmitting a random data value to said data bus in response to a predefined one of said control signals.

15. Memory apparatus as set forth in claim 4, wherein said computer system further includes memory receptacle means for coupling memory means in a plug-in memory cartridge to said data and address busses; and said memory apparatus comprise a plug-in memory cartridge including a cartride housing, compatible with said computer system's memory receptacle means, for holding said first and second memory means and said video data acquisition means.

16. For use in a computer system having a raster scan video display, a central processing unit (CPU), and data and address busses coupled to said CPU for transmitting and receiving data to and from specified address locations in said computer system, said address bus including a multiplicity of binary address lines, and memory receptacle means for coupling memory means in a plug-in memory cartridge to said data and address busses, a plug-in memory cartridge comprising:

(1) first memory means, coupled to said address and data busses, for storing program instructions for controlling the operation of said computer system;

(2) second memory means having a data output port, and a multiplicity of addressable memory locations for storing video display data for display on said video display;

(3) video data acquisition means, coupling said second memory means to said address and data busses, for responding to each of a multiplicity of predefined address signal values asserted on said address bus by said CPU by transmitting corresponding selected portions of the video data in said second memory means to said data bus, including (a) decoder means coupled to said address bus for generating a multiplicity of distinct control signals when said CPU asserts corresponding address signal values on said address bus;

(b) a multiplicity of data fetcher means, each for generating a sequence of address signal values usable for addressing said second memory means, each including (1) video data selection means coupled to said data bus, responsive to predefined ones of said control signals, for selecting a sequence of video address signal values in accordance with data signal values asserted on said data bus by said CPU at the time said control signals are generated; and (2) video address generating means for generating the next address signal from said sequence of video address signal values each time said decoder means generates a predefined one of said control signals;

(c) video memory address multiplexer means, responsive to the address signal value on a first predefined subset of said binary address lines, for addressing said second memory means using the address signal value generated by the data fetcher means corresponding to the address signal value on said first predefined subset of said binary address lines; and (d) output logic, coupling said data output port of said second memory means to said data bus; and (4) a cartridge housing, compatible with said computer system's memory receptacle means, for holding said first and second memory means and said video data acquisition means.

17. A plug-in memory cartridge as set forth in claim 16, wherein said output logic is responsive to the address signal on a second predefined subset of said binary address lines, for transmitting the data on said data output port of said second memory means to said data bus in one of multiplicity of predefined formats selected in accordance with the address signal value on said second predefined subset of said binary address lines.

18. A plug-in memory cartridge as set forth in claim 16, further including music means for generating a music signal and transmitting said music signal to said data bus in response to a predefined one of said control signals, including square wave means for generating a square wave signal with a frequency which is a specified fraction of the frequency that said decoder means generates a predefined one of said control signals; and music amplitude means for generating an amplitude value corresponding to the logical state of said square wave signal and transmitting said amplitude value to said data bus in response to a predefined one of said control signals.

19. A plug-in memory cartridge as set forth in claim 16, further including music means for generating a music signal and transmitting said music signal to said data bus in response to a predefined one of said control signals, including a plurality of square wave means, each generating a square wave signal with a frequency which is an individually specified fraction of the frequency that said decoder means generates a corresponding predefined one of said control signals; and music amplitude means for generating an amplitude value and transmitting said amplitude value to said data bus in response to a predefined one of said control signals, said amplitude value being the weighted sum of said square wave signals.

20. A plug-in memory cartridge as set forth in claim 16, wherein at least one of said data fetcher means is a drawline data fetcher having two distinct modes of operation: data fetcher mode and drawline mode, said drawline data fetcher including:

first register means for storing a first value;

second register means for storing a second value;

adder means for adding said first value to said second value and storing the result in said second register means in response to a predefined one of said control signals, including means for producing a carry signal when said adding operation overflows a predefined portion of said second register means; and movement value means for transmitting a predefined horizontal movement value to said data bus when said adder means produces said carry signal.

* * * * *